United States Patent [19]

Kmiec et al.

[11] Patent Number: 4,632,950
[45] Date of Patent: Dec. 30, 1986

[54] SCORCH RESISTANT, CROSSLINKABLE COMPOSITION CONTAINING MIXTURE OF COPPER AND METAL DITHIOCARBAMATES

[75] Inventors: Chester J. Kmiec, Williamsville; Michael F. Novits, Buffalo, both of N.Y.

[73] Assignee: Pennwalt Corporation, Philadelphia, Pa.

[21] Appl. No.: 773,713

[22] Filed: Sep. 9, 1985

[51] Int. Cl.$^4$ .......................... C08K 5/48; C08K 5/39; C09K 15/32
[52] U.S. Cl. .................................... 524/202; 524/201; 524/203; 525/387
[58] Field of Search ............... 524/202, 203, 204, 201; 525/331.8, 331.1, 333.5, 345, 387, 343; 568/559; 252/400 R

[56] References Cited

U.S. PATENT DOCUMENTS

| | | | |
|---|---|---|---|
| 2,713,564 | 7/1955 | Pfeifer et al. | 524/202 |
| 3,335,124 | 8/1967 | Larsen | 525/343 |
| 3,378,510 | 4/1968 | Wheat | 524/202 |
| 3,649,542 | 3/1972 | Hasebe et al. | 524/202 |
| 3,941,759 | 3/1976 | Taylor et al. | 524/202 |

*Primary Examiner*—Veronica P. Hoke

[57] ABSTRACT

A crosslinkable composition of a polymeric thermoplastic and/or elastomeric material which is susceptible to scorching when processed at elevated temperatures, prior to crosslinking, in the presence of a free radical initiator, is protected against such scorching by the incorporation therein of a mixture of at least two metal salts of disubstituted dithiocarbamic acid, wherein one metal salt is based on copper.

8 Claims, No Drawings

4,632,950

SCORCH RESISTANT, CROSSLINKABLE COMPOSITION CONTAINING MIXTURE OF COPPER AND METAL DITHIOCARBAMATES

BACKGROUND OF THE INVENTION

This invention relates to the prevention of scorching prior to crosslinking of a peroxide crosslinkable thermoplastic and/or elastomeric polymer composition.

A major difficulty in using organic peroxides or azo compounds in crosslinking elastomeric and thermoplastic materials applications is that they are susceptible to premature crosslinking (i.e., scorch) during compounding and/or processing prior to the actual curing phase. With conventional methods of compounding, such as milling, banbury, or extrusion, scorch occurs when the time-temperature relationship results in a condition where the peroxide or azo initiator undergoes thermal decomposition, initiating the crosslinking reaction whereby gel particles may be formed. Excessive scorch may cause the loss of the entire batch, or plugging of equipment.

One method of avoiding scorch is to use an initiator that is characterized by having a high 10 hr. half-life temperaure for the given application. The disadvantage to this approach is that one subsequently obtains a longer cure time, which results in lower throughput. High cure temperatures can be used but this results in higher energy costs, also a disadvantage.

Another method for avoiding scorch is to lower the compounding and/or processing temperature to improve the scorch safety margin of the crosslinking agent. However, depending upon the polymer and/or process involved, this option may also be limited in scope. In addition, curing at the lower temperature results in lower throughput.

Prior to the present invention certain additives were incorporated into compositions which reduced the tendency for scorching. For example, British Pat. No. 1,535,039 discloses the use of organic hydroperoxides as scorch inhibitors for peroxide-cured ethylene polymer compositions. U.S. Pat. No. 3,751,378 discloses the use of N-nitroso diphenylamine or N,N'-dinitroso-paraphenyldiphenylamine as retarders incorporated in a polyfunctional acrylate crosslinking monomer for providing long mooney scorch times in various elastomer formulations. U.S. Pat. No. 3,202,648 discloses the use of nitrates such as isoamyl nitrite, tert-decyl nitrite and others as scorch inhibitors for polyethylene. U.S. Pat. No. 3,954,907 discloses the use of monomeric vinyl compounds such as α-methylstyrene and n-butyl methacrylate as scorch inhibitors for peroxide-cured ethylene polymers. U.S. Pat. No. 3,335,124 describes the use of various antioxidants and vulcanization accelerators as scorch inhibitors for peroxide-cured polyethylene.

With these prior art methods, the cure time can also be altered and/or the crosslink density of the cured composition can also be altered. This can lead to a change in productivity and/or product performance.

The present invention overcomes the prior art disadvantages in that an improvement in scorch at compounding temperatures is achieved without significant impact on the final cure time or crosslink density. This is achieved by incorporation of low additive levels, which limits the effect on properties. In addition, significant scorch protection is achieved, since the metal salt combination results in a synergistic effect on scorch time at these low levels.

SUMMARY OF THE INVENTION

The present invention is directed to a novel peroxide composition comprising an organic peroxide free radical initiator and a mixture of at least two metal salts of disubstituted dithiocarbamic acid wherein one metal salt is based on copper and the weight ratio of non-copper salt(s) to copper based salt is 1:1 to 30:1 and the weight ratio of organic peroxide to metal salts is 100:1 to 5:1.

This invention also is directed to a scorch resistant, crosslinkable composition comprising a polymeric thermoplastic and/or elastomeric material, an organic peroxide free radical initiator, and a mixture of at least two metal salts of disubstituted dithiocarbamic acid, wherein one metal salt is based on copper and the weight ratio of non-copper salt(s) to copper based salt is 1:1 to 30:1, and the weight ratio of organic peroxide to metal salts is 100:1 to 5:1.

This invention also comprehends a process of crosslinking the above mentioned polymeric material composition at temperatures in the range of 200° to 600° F. whereby the composition possesses superior scorch safety under the operating conditions.

DETAILED DESCRIPTION OF THE INVENTION

In accordance with the present invention, it has now been unexpectedly discovered that superior scorch resistance of peroxide containing thermoplastic and/or elastomeric compositions can be achieved by incorporating into said composition a mixture of two or more metal salts of disubstituted dithiocarbamic acid, whereby one is a copper salt.

POLYMERIC COMPOUNDS

The polymeric compounds encompassed in the present invention are those defined as natural or synthetic materials which are thermoplastic or elastomeric in nature, and which can be crosslinked through the action of a free radical crosslinking agent. Reference can be made to Rubber World, "Elastomer Crosslinking with Diperoxyketals", October, 1983, pp. 26–32, and Rubber and Plastics News, "Organic Peroxides for Rubber Crosslinking", Sept. 29, 1980, pp. 46–50, as to the crosslinking action and crosslinkable polymers. For the process of this invention, these polymeric compounds include materials, such as ethylene-propylene terpolymers, ethylene-propylene co-polymers, 1,4-polybutadiene, chlorinated polyethylene, low density polyethylene (including linear low density polyethylene), high density polyethylene, silicone rubber, nitrile rubber, neoprene, fluoroelastomers, and ethylene-vinyl acetate.

Polymers that contain sulfur, such as chloro-sulfonated polyethylene are not included within the scope of this invention.

In addition, blends of two or more polymeric materials can be used in this invention.

INITIATORS

In accordance with the present invention, compounds such as organic peroxides and/or azo initiators, which upon thermal decomposition generate free radicals that facilitate the crosslinking reaction may be employed. Of the free radical initiators used as crosslinking agents, the dialkyl peroxide and diperoxyketal initiators are preferred. A detailed description of these compounds can be found in the *Encyclopedia of Chemical Technology*, 3rd edition, vol. 17, pp. 27-90.

In the group of dialkyl peroxides, the preferred initiators are dicumyl peroxide, di-t-butyl peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3,2,5-dimethyl-2,5-di(t-amylperoxy)hexyne-3, α,α-di[(t-butylperoxy)isopropyl]benzene, di-t-amyl peroxide, and 1,3,5-tri-[(t-butylperoxy)isopropyl]benzene.

In the group of diperoxyketal initiators, the preferred initiators are 1,1-di(t-butylperoxy)-3,3,5-trimethylcyclohexane, 1,1-di(t-butylperoxy)cyclohexane, n-butyl 4,4-di(t-butylperoxy)valerate, ethyl 3,3-di(t-butylperoxy)butyrate, ethyl 3,3-di(t-amylperoxy)butyrate, 2,2-di(t-amylperoxy)propane, 3,6,6,9,9-pentamethyl-3-n-butyl-1,2,4,5-tetraoxacyclononane, and 3,6,6,9,9-pentamethyl-3-ethoxycarbonylmethyl-1,2,4,5-tetraoxacyclononane.

Other peroxides and/or azo initiators may also be used to provide a crosslinked polymer matrix. Mixtures of two or more free radical initiators may also be used together as the initiator within the scope of this invention.

The amount of crosslinking agent present in the crosslinkable composition of this invention is sufficient to afford the desired degree of crosslinking. The amount of peroxide can range from 0.1 to 10 parts by weight for each 100 parts by weight of polymeric compound. Preferably, 0.5 to 5.0 parts initiator will be used.

SCORCH INHIBITORS

The metal salts of disubstituted dithiocarbamic acid, which are suitable in the practice of this invention, can be represented by the structure,

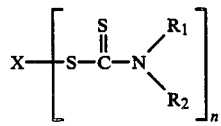

wherein X is a metal such as nickel, cobalt, iron, chromium, tin, zinc, copper, lead, bismuth, cadmium, selenium, or tellurium; n is an integer of 1 to 6 having a value equal to the valence of the metal. $R_1$ and $R_2$ are independently alkyl of 1 to 7 carbon atoms.

Examples of the metal salt of disubstituted dithiocarbamic acid include bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium dimethyldithiocarbamate, tellurium diethyldithiocarbamate, zinc diamyldithiocarbamate, zinc diethyldithiocarbamate, zinc dimethyldithiocarbamate, and selenium dimethyldithiocarbamate.

Two or more of the above metal salts may be used, however, one metal salt must be based on copper. Preferred mixtures include copper dimethyldithiocarbamate in combination with one of the following: zinc dimethyldithiocarbamate, zinc diethyldithiocarbamate, cadmium diethyldithiocarbamate, cadmium diamyldithiocarbamate, bismuth dimethyldithiocarbamate, nickel dimethyldithiocarbamate, selenium diethyldithiocarbamate and lead dimethyldithiocarbamate. Most preferably are the mixtures of copper dimethyldithiocarbamate and zinc dimethyldithiocarbamate or zinc diethyldithiocarbamate.

The level of metal salt is in an amount that is sufficient to achieve the desired balance in cure characteristics. Use levels can range from 0.001 to 2.0 parts by weight per hundred parts by weight of polymer, preferably 0.01 to 0.5 parts by weight. The weight ratio of non-copper based salts to the copper based metal salt can range from preferably a ratio of 1:1 to 30:1. The weight ratio of organic peroxide to the metal salt blend can range from 100:1 to 5:1, preferably from 50:1 to 10:1.

In the novel peroxide compositions of the present invention of a mixture of an organic peroxide and metal salt blend wherein two or more metal salts of disubstituted dithiocarbamic acid are used where one metal salt must be based on copper, the components of organic peroxide and metal salt blend of the novel composition are used at a weight ratio of organic peroxide to metal salt blend from 100:1 to 5:1, preferably at a weight ratio of 50:1 to 10:1. These novel compositions can also contain one or more fillers (or carriers). Some of the commonly used fillers are calcium carbonate, calcium silicate, silica and various grades of clay. Also, polymeric carriers such as EPDM and EPM may be used in this novel composition.

Incorporation of a filler is preferred wherein the organic peroxide in its natural state is a liquid or a semicrystalline material. Generally accepted industry practice is to incorporate 40 to 50% organic peroxide onto a filler such as those previously mentioned. Incorporation of the metal salt into such extended peroxides is also within the scope of this invention.

The crosslinkable composition of the present invention may also contain fillers such as carbon black, titanium dioxide, the alkaline earth metal carbonates, and co-agents such as triallylcyanurate, triallylisocyanurate, liquid 1,2-polybutadienes, various methacrylates and acrylate compounds, but not sulfur.

Metal oxides such as zinc oxide and magnesium oxide can also be included in the composition. The composition may also contain antioxidants, stabilizers, plasticizers, and processing oils.

PROCESS CONDITIONS

The crosslinkable composition is heat cured to a time sufficient to obtain the desired degree of crosslinking. The heat curing has a temperature-time relationship which is primarily dependent on the polymeric compound and the peroxide or azo initiator present, but is also affected by the formulation as a whole. It is customary to use a time equal to about 6-8 half-lives of the initiator.

The crosslinking may be carried out at a temperature of 200°-600° F. or more. The cure time is inversely related to temperature. The preferred initiators heat cure at temperature-time relations of about 300°-500° F. and 0.5 to 30 minutes.

The heat curing may be carried out in any of the manners now used by the industry. These might be mold cures, or oil bath cures, where oil does not harm the polymeric compound; or oven cures, steam cures, or hot metal salt bath cures.

EXAMPLES

Standard Experimental Procedures

All formulations were compounded using the C. W. Brabender Plastic-Corder with roller-5 type mixing blades. Unless otherwise specified in the specific examples, no mixer preheating was required; the mixer was at ambient temperature.

For thermoplastic polymers, all components of the composition, except the polymer, were weighed at the desired parts by weight of polymer into a three ounce waxed paper cup, and mixed using a small metal spatula. For elastomeric compositions, the components of carbon black, processing oils, zinc oxide, and monomer/coagent (when used) were weighed at the desired parts by weight of resin into a three ounce waxed paper cup (Cup 1) and mixed using a small metal spatula. The components of antioxidants, inhibitors, and peroxide (when used) were weighed at the desired parts by weight resin into a second three ounce waxed paper cup (Cup 2) and mixed using a small metal spatula.

The specific parts per 100 parts of polymer are listed in each example.

For thermoplastic compositions, 100 parts by weight of polymer were fluxed in the mixer using a mixing speed of 50 rpm at a mixing temperature designated in the specific examples. The preweighed component mixture was then slowly added to the fluxing resin. The composition was then allowed to mix for three (3) minutes, afterwhich the composition was removed and subsequently pressed into a flat plaque (of no specific thickness), using a room temperature Carver laboratory press (model C), and then the plaque was allowed to cool to room temperature.

For elastomeric compositions, 100 parts by weight of elastomer were fluxed in the C. W. Brabender Plasticorder using a mixing speed of 15 rpm. The contents of Cup 1 were then added to the fluxing elastomer. The contents of Cup 2 were then slowly added to the mixer. The rpm was then incresed to 30, and the composition was allowed to mix for two (2) minutes. The entire composition was then removed from the mixer, and subsequently added slowly back to the mixer under a mixing speed of 20 rpm. Once the entire composition was added to the mixer, it was allowed to mix for an additional two (2) minutes. The composition was then removed and subsequently pressed into a flat plaque (no specific thickness) using a room temperature Carver laboratory press (model C). The flat sheet was then folded, and again pressed out. This step was repeated four (4) times. The resulting plaque was then allowed to cool to room temperature.

Testing

Evaluations were carried out on the prepared compositions using a Monsanto Oscillating Disk Rheometer (Model R-100).

The Monsanto Rheometer test procedure consists of an uncured sample enclosed, under positive pressure, in a heated die cavity containing a biconical disk. The disk is oscillated (100 cycles/min) through an arc of 1° or 3° or 5°. The force, or torque, required to oscillate the disk is recorded as a function of time. This shear modulus is proportional to the extent of crosslinking, and is a representation of the cure reaction. The shear modulus increases as percent crosslinking increases. The test variable recorded from the rheometer were:

$M_H$—Maximum torque (in-lbs), a measure of crosslinking attained.

$M_L$—Minimum torque (in-lbs), a measure of viscosity of the compound and an indicator of scorch. Increased $M_L$ values are indicative of scorch.

$M_H$-$M_L$—Difference between maximum and minimum torque values. This value is useful in determining extent of crosslinking.

$T_{C90}$—Cure time (minutes), time to reach 90% of maximum torque as defined by $(M_H$-$M_L)$ $0.9+M_L$.

$T_{S1}$—Scorch time (minutes), time required for torque to increase one inch-pounds above $M_L$.

$T_{S2}$—Scorch time (minutes), time required for torque to increase two inch-pounds above $M_L$.

$T_{S2}*$—A value herein referred to as compounding scorch time, and is equal to the time required to reach two inch-pounds torque above minimum torque $(M_L)$. It is a measure of available working time. Values were obtained at temperatures that are normally used in the industry for compounding. These temperatures are generally significantly lower than those used for the final crosslinking step and vary with the type of polymer, the amount and type of fillers, and the type of equipment used.

It is desired to increase the working time (i.e., scorch protection) during compounding without sacrificing final cure properties. In the practice of this invention, $T_{S2}*$ values illustrate available working time under compounding conditions.

The final cure properties are normally characterized by the cure time ($T_C=90$) and the net-torque value $(M_H$-$M_L)$ under typical crosslinking temperatures. These values commonly are obtained by using a Monsanto rheometer.

Torque values reported ($M_H$, $M_L$, $M_H$-$M_L$) are rounded off to the nearest whole number. Time values reported ($T_{C90}$, $T_{S1}$, $T_{S2}$) are rounded off to the nearest tenth of one minute. Crosslinking evaluations, where applicable, were also carried out by the obtainment of physical property data. Thirty-eight grams of the appropriate compounded composition were cured in a 5 in×5 in×0.075 inch rubber mold in a Carver Laboratory Press (model C). The cure temperature was the same as the Monsanto Oscillating Disk Rheometer temperature illustrated in the appropriate example. The press cure time was $T_{C90}$ plus two (2) minutes for the specific Monsanto Oscillating Disk Rheometer temperature illustrated in the appropriate examples. Modulus, ultimate tensile (at break), and percent elongation were determined on the Instron following ASTM D-412, Die C test procedure. The values obtained were the average of five test samples. The value reported was rounded off to the nearest multiple of 10.

Hardness of the compositions was obtained by using a Shore Durometer 20/80 scale.

The preparation and crosslinking determination test used in each of the following examples and comparative tests (unless otherwise indicated) were the standard experimental procedure.

EXAMPLE 1

This example illustrates the significant improvement in scorch time ($T_{S2}*$) with a mixture of zinc dimethyldithiocarbamate and copper dimethyldithiocarbamate in a 1,4-polybutadiene elastomer. The rheometer test conditions were 149° C., ±1° arc.

TABLE 1

| Composition | Parts by Weight | | | |
|---|---|---|---|---|
| | A | B | C | D |
| TakTene ® XC-575[1] | 100 | 100 | 100 | 100 |
| Zinc dimethacrylate | 50 | 50 | 50 | 50 |
| ZnO | 15 | 15 | 15 | 15 |
| Zinc dimethyldithio-carbamate | — | 0.06 | — | 0.06 |
| Copper dimethyldithio-carbamate | — | — | 0.006 | 0.006 |
| Luperco ® 231-XL[2] | 4.0 | 4.0 | 4.0 | 4.0 |
| $M_H$ (in-lbs) | 134 | 131 | 132 | 129 |
| $M_H-M_L$ (in-lbs) | 126 | 123 | 124 | 121 |
| $T_{C90}$ (mins) | 3.9 | 4.0 | 3.7 | 3.7 |
| $T_{S1}$ (mins) | 0.3 | 0.4 | 0.4 | 0.7 |
| $T_{S2}$* (mins) | 0.8 | 1.1 | 1.2 | 2.9 |

*Values obtained were under rheometer conditions of 121° C., ±3° arc.
[1] high cis polybutadiene rubber with a specific gravity of 0.92 and a Mooney Viscosity (ML1 + 4 (100° C.)) of 35–45, from Polysar, Inc.
[2] 40% 1,1-bis(t-butylperoxy)-3,3,5-trimethylcyclohexane on inert filler from Pennwalt Corporation.

Column D shows that the mixture of zinc dimethyldithiocarbamate and copper dimethyldithiocarbamate significantly increase the $T_{S2}$* value over Column A. Column D also illustrates a synergistic effect as described previously. Column D as compared to Column A also illustrates the marginal effect on cure properties.

EXAMPLE 2

This example illustrates the synergistic effect of the mixture of zinc dimethyldithiocarbamate and copper dimethyldithiocarbamate in a 1,4-polybutadiene based composition. The rheometer test conditions were 135° C., ±1° arc.

TABLE 2

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Zinc dimethyldithio-carbamate | — | 0.06 | — | 0.06 |
| Copper dimethyldithio-carbamate | — | — | 0.006 | 0.006 |
| $M_H$ (in-lbs) | 144 | 145 | 145 | 144 |
| $M_H-M_L$ (in-lbs) | 138 | 139 | 139 | 139 |
| $T_{S2}$* (mins) | 2.8 | 4.0 | 3.1 | 7.2 |
| 10% Modulus (psi) | 1800 | 1890 | 1960 | 1830 |
| Ultimate tensile (psi) | 2620 | 2310 | 2330 | 2680 |
| Elongation (%) | 30 | 20 | 20 | 30 |
| Shore A hardness | 120 | 121 | 123 | 122 |

*Values obtained were under rheometer conditions of 107° C., ±3° arc.

Column D illustrates that the mixture of metal salts yielded a synergistic effect, as described previously, in scorch time ($T_{S2}$*) at 107° C. In addition, minimal effect by the mixture on rheometer cure properties (at 135° C.) and on physical properties of the cured composition were observed when compared to the control values listed in Column A.

EXAMPLE 3

This example illustrates the effect on scorch resistance of varying ratios of zinc dimethyldithiocarbamate and copper dimethyldithiocarbamate in a 1,4-polybutadiene based composition. The rheometer test conditions were 135° C., ±1° arc.

TABLE 3

| Compositions | Parts by Weight | | | | | |
|---|---|---|---|---|---|---|
| | A | B | C | D | E | F |
| TakTene ® XC-575 | 100 | 100 | 100 | 100 | 100 | 100 |
| Zinc diacrylate | 50 | 50 | 50 | 50 | 50 | 50 |
| ZnO | 15 | 15 | 15 | 15 | 15 | 15 |
| Luperco ® 231-XL | 4.0 | 4.0 | 4.0 | 4.0 | 4.0 | 4.0 |
| Zinc dimethyldithiocarbamate | — | 0.03 | 0.06 | 0.054 | 0.063 | 0.09 |
| Copper dimethyldithiocarbamate | — | 0.003 | 0.006 | 0.012 | 0.003 | 0.009 |
| $M_H$ (in-lbs) | 144 | 144 | 144 | 144 | 145 | 145 |
| $M_H-M_L$ (in-lbs) | 138 | 138 | 139 | 139 | 139 | 139 |
| $T_{S2}$* (mins) | 2.8 | 5.0 | 7.2 | 8.2 | 5.7 | 7.7 |
| 10% Modulus (psi) | 1800 | 1890 | 1830 | 1750 | 1880 | 1870 |
| Ultimate tensile (psi) | 2620 | 2190 | 2680 | 2600 | 2320 | 2700 |
| Elongation (%) | 30 | 20 | 30 | 30 | 20 | 30 |
| Shore A Hardness | 120 | 122 | 122 | 120 | 122 | 121 |

*Values obtained were under rheometer conditions of 107° C., ±3° arc.

This example indicates that the $T_{S2}$* (107° C.) value can be varied considerably by adjusting the levels of zinc dimethyldithiocarbamate and copper dimethyldithiocarbamate. The results show a minimal effect by the mixture on the rheometer cure properties at 135° C. Physical properties were also only marginally affected as compared to the control (Column A).

EXAMPLES 4–12

These examples illustrate the synergistic effect on scorch time ($T_{S2}$*) of various metal salts of disubstituted dithiocarbamic acid in combination with copper dimethyldithiocarbamate in a 1,4-polybutadiene based composition. Also illustrated in these examples is the negligible effect of the mixture (Column D) on rheometer cure properties (at 135° C., ±1° arc), as compared to the control (Column A).

TABLE 4

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Zinc diethyldithio-carbamate | — | 0.06 | — | 0.06 |
| Copper dimethyldithio-carbamate | — | — | 0.006 | 0.006 |
| $M_H$ (in-lbs) | 147 | 150 | 150 | 149 |
| $M_H-M_L$ (in-lbs) | 142 | 142 | 144 | 141 |
| $T_{C90}$ (mins) | 3.8 | 4.0 | 3.6 | 4.0 |
| $T_{S2}$ (mins) | 0.8 | 0.8 | 1.1 | 1.5 |
| $T_{S2}$° (mins) | 2.4 | 2.7 | 3.4 | 6.7 |

*Values obtained were under rheometer conditions of 107° C., ±3° arc.

TABLE 5

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Zinc dibutyldithio-carbamate | — | 0.06 | — | 0.06 |
| Copper dimethyldithio-carbamate | — | — | 0.006 | 0.006 |
| $M_H$ (in-lbs) | 147 | 152 | 150 | 148 |
| $M_H-M_L$ (in-lbs) | 142 | 148 | 144 | 140 |
| $T_{C90}$ (mins) | 3.8 | 4.2 | 3.6 | 3.8 |
| $T_{S2}$ (mins) | 0.8 | 0.9 | 1.1 | 1.4 |

TABLE 5-continued

| Composition | Parts by Weight | | | |
|---|---|---|---|---|
| | A | B | C | D |
| $T_{S2}$* (mins) | 2.4 | 2.5 | 3.4 | 5.2 |

*Values obtained were under rheometer conditions of 107° C., ±3° arc.

TABLE 6

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Cadmium diethyldithio-carbamate | — | 0.06 | — | 0.06 |
| Copper dimethyldithio-carbamate | — | — | 0.006 | 0.006 |
| $M_H$ (in-lbs) | 147 | 144 | 150 | 144 |
| $M_H$-$M_L$ (in-lbs) | 142 | 138 | 144 | 138 |
| $T_{C90}$ (mins) | 3.8 | 3.6 | 3.6 | 3.7 |
| $T_{S2}$ (mins) | 0.8 | 1.0 | 1.1 | 1.4 |
| $T_{S2}$* (mins) | 2.4 | 4.2 | 3.4 | 7.0 |

*Values obtained were under rheometer conditions of 107° C., ±3° arc.

TABLE 7

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Tellurium diethyldithio-carbamate | — | 0.06 | — | 0.06 |
| Copper dimethyldithio-carbamate | — | — | 0.006 | 0.006 |
| $M_H$ (in-lbs) | 147 | 144 | 150 | 144 |
| $M_H$-$M_L$ (in-lbs) | 142 | 137 | 144 | 137 |
| $T_{C90}$ (mins) | 3.8 | 3.4 | 3.6 | 3.6 |
| $T_{S2}$ (mins) | 0.8 | 0.8 | 1.1 | 1.3 |
| $T_{S2}$* (mins) | 2.4 | 4.0 | 3.4 | 5.3 |

*Values obtained were under rheometer conditions of 107° C., ±3° arc.

TABLE 8

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Nickel dimethyldithio-carbamate | — | 0.06 | — | 0.06 |
| Copper dimethyldithio-carbamate | — | — | 0.006 | 0.006 |
| $M_H$ (in-lbs) | 147 | 147 | 150 | 149 |
| $M_H$-$M_L$ (in-lbs) | 142 | 141 | 144 | 143 |
| $T_{C90}$ (mins) | 3.8 | 3.9 | 3.6 | 4.4 |
| $T_{S2}$ (mins) | 0.8 | 1.1 | 1.1 | 1.8 |
| $T_{S2}$* (mins) | 2.4 | 2.8 | 3.4 | 6.8 |

*Values obtained were under rheometer conditions of 107° C., ±3° arc.

TABLE 9

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 50 |
| Luperco ® 231-XL | 4.0 | 4.0 | 4.0 | 4.0 |
| Bismuth dimethyldithio-carbamate | — | 0.06 | — | 0.06 |
| Copper dimethyldithio-carbamate | — | — | 0.006 | 0.006 |
| $M_H$ (in-lbs) | 147 | 142 | 150 | 153 |
| $M_H$-$M_L$ (in-lbs) | 142 | 136 | 144 | 147 |
| $T_{C90}$ (mins) | 3.8 | 3.7 | 3.6 | 4.3 |
| $T_{S2}$ (mins) | 0.8 | 1.0 | 1.1 | 1.6 |
| $T_{S2}$* (mins) | 2.4 | 3.5 | 3.4 | 8.3 |

*Values obtained were under rheometer conditions of 107° C., ±3° arc.

TABLE 10

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Selenium diethyldithio-carbamate | — | 0.06 | — | 0.06 |
| Copper dimethyldithio-carbamate | — | — | 0.006 | 0.006 |
| $M_H$ (in-lbs) | 147 | 145 | 150 | 143 |
| $M_H$-$M_L$ (in-lbs) | 142 | 139 | 144 | 137 |
| $T_{C90}$ (mins) | 3.8 | 4.0 | 3.6 | 3.6 |
| $T_{S2}$ (mins) | 0.8 | 1.3 | 1.1 | 1.7 |
| $T_{S2}$* (mins) | 2.4 | 5.3 | 3.4 | 8.4 |

*Values obtained were under rheometer conditions of 107° C., ±3° arc.

TABLE 11

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Lead diamyldithio-carbamate | — | 0.06 | — | 0.06 |
| Copper dimethyldithio-carbamate | — | — | 0.006 | 0.006 |
| $M_H$ (in-lbs) | 147 | 146 | 150 | 138 |
| $M_H$-$M_L$ (in-lbs) | 142 | 140 | 144 | 132 |
| $T_{C90}$ (mins) | 3.8 | 4.5 | 3.6 | 3.0 |
| $T_{S2}$ (mins) | 0.8 | 0.9 | 1.1 | 1.2 |
| $T_{S2}$* (mins)* | 2.4 | 3.2 | 3.4 | 5.0 |

*Values obtained were under rheometer conditions of 107° C., ±3° arc.

TABLE 12

| Composition | Parts by Weight | | | |
|---|---|---|---|---|
| | A | B | C | D |
| TakTene ® XC-575 | 100 | 100 | 100 | 100 |
| Zinc diacrylate | 50 | 50 | 50 | 50 |
| ZnO | 15 | 15 | 15 | 15 |
| Luperco ® 231-XL | 4.0 | 4.0 | 4.0 | 4.0 |
| Lead dimethyldithio-carbamate | — | 0.06 | — | 0.06 |
| Copper dimethyldithio-carbamate | — | — | 0.006 | 0.006 |
| $M_H$ (in-lbs) | 147 | 144 | 150 | 145 |
| $M_H$-$M_L$ (in-lbs) | 142 | 138 | 144 | 141 |
| $T_{C90}$ (mins) | 3.8 | 3.2 | 3.6 | 3.7 |
| $T_{S2}$ (mins) | 0.8 | 0.9 | 1.1 | 1.3 |
| $T_{S2}$* (mins) | 2.4 | 3.5 | 3.4 | 6.8 |

*Values obtained were under rheometer conditions of 107° C., ±3° arc.

EXAMPLE 13

This example illustrates the synergistic effect of the mixture of zinc dimethyldithiocarbamate and copper dimethyldithiocarbamate on scorch resistance in an EPDM based composition. The rheometer test conditions were 171° C., ±3° arc.

TABLE 13

| Composition | Parts by Weight | | | |
|---|---|---|---|---|
| | A | B | C | D |
| Royalene ® 521[a] | 100 | 100 | 100 | 100 |
| N-990[b] | 40 | 40 | 40 | 40 |
| N-550[c] | 25 | 25 | 25 | 25 |
| Sunpar ® 2280[d] | 10 | 10 | 10 | 10 |
| ZnO | 5.0 | 5.0 | 5.0 | 5.0 |
| Agerite ® MA[e] | 0.5 | 0.5 | 0.5 | 0.5 |
| Luperco ® 500 - 40KE[f] | 6.0 | 6.0 | 6.0 | 6.0 |
| Zinc dimethyldithio-carbamate | — | 0.06 | — | 0.06 |
| Copper dimethyldithio-carbamate | — | — | 0.004 | 0.004 |
| $M_H$ (in-lbs) | 66 | — | 69 | 67 |
| $M_H$-$M_L$ (in-lbs) | 57 | — | 60 | 58 |
| $T_{C90}$ (mins) | 11.2 | — | 10.7 | 10.8 |
| $T_{S2}$ (mins) | 1.3 | — | 1..3 | 1.5 |
| $T_{S2}$* (mins) | 10.0 | 14.2 | 10.2 | 16.7 |

*Values obtained were under rheometer conditions of 135° C., ±3° arc.
[a]ethylene-propylene-diene (EPDM) rubber with a Mooney Viscosity (ML1 + 4(100° C.)) of 40–50 from Uniroyal Chemical Co.
[b]MT carbon black from J. M. Huber Corp.
[c]FEF carbon black from Cabot Corp.
[d]paraffinic oil from Sun Refining and Marketing Co.
[e]polymerized 1,2-dihydro-2,2,4-trimethylquinoline (antioxidant) from R. T. Vanderbilt Co. Inc.
[f]40% dicumyl peroxide on Burgess KE clay from Pennwalt Corp.

The $T_{S2}$* value at 135° C. for Column D indicates a synergistic effect in scorch time as previously described. The example also illustrates the negligible effect of the mixture on rheometer cure properties at 171° C., ±3° arc when Column D and Column A are compared.

EXAMPLE 14

This example illustrates the synergistic effect of the mixture of zinc dimethyldithiocarbamate and copper dimethyldithiocarbamate on scorch resistance in an EPDM based composition. The rheometer test conditions were 149° C., ±3° arc.

TABLE 14

| Composition | Parts by Weight | | | |
|---|---|---|---|---|
| | A | B | C | D |
| Polysar ® 585 EPDM[a] | 100 | 100 | 100 | 100 |
| N-539[b] | 70 | 70 | 70 | 70 |
| Sunpar ® 2280 | 15 | 15 | 15 | 15 |
| Luperco ® 231-XL | 5.0 | 5.0 | 5.0 | 5.0 |
| Zinc dimethyldithio-carbamate | — | 0.10 | — | 0.10 |
| Copper dimethyldithio-carbamate | — | — | 0.006 | 0.006 |
| $M_H$ (in-lbs) | 81 | 78 | 86 | 81 |
| $M_H$-$M_L$ (in-lbs) | 62 | 60 | 67 | 63 |
| $T_{C90}$ (mins) | 10.6 | 10.7 | 9.2 | 9.6 |
| $T_{S2}$ (mins) | 1.5 | 1.6 | 1.6 | 1.6 |
| $T_{S2}$* (mins) | 7.6 | 7.4 | 7.7 | 8.6 |
| 200% Modulus (psi) | 1650 | 1390 | 1610 | 1410 |
| Ultimate tensile (psi) | 2660 | 2540 | 2790 | 2800 |
| Elongation (%) | 260 | 280 | 270 | 300 |
| Shore A Hardness | 77 | 77 | 77 | 75 |

*Value obtained under rheometer conditions of 121° C., ±3° arc.
[a]ethylene-propylene-diene rubber with a specific gravity of 0.86 and a Mooney Viscosity (ML1 + 8 (100° C.)) of 49–61 from Polysar Inc.
[b]FEF-LS carbon black from Cabot Corp.

A synergistic effect in scorch time, as previously described, was obtained with the mixture, Column D, when the $T_{S2}$* values at 121° C., ±3° arc were compared. Minimal effect on rheometer cure properties at 149° C., ±3° arc, and on physical properties of the cured composition was obtained by the use of the inhibitor mixture.

EXAMPLE 15

This example illustrates the effect on scorch resistance of varying ratios of zinc dimethyldithiocarbamate and copper dimethyldithiocarbamate in an EPDM based composition. The rheometer test conditions were 171° C., ±3° arc.

TABLE 15

| Compositions | Parts by Weight | | | | | |
|---|---|---|---|---|---|---|
| | A | B | C | D | E | F |
| Royalene ® 521 | 100 | 100 | 100 | 100 | 100 | 100 |
| N-990 | 40 | 40 | 40 | 40 | 40 | 40 |
| N-550 | 25 | 25 | 25 | 25 | 25 | 25 |
| Sunpar 2280 | 10 | 10 | 10 | 10 | 10 | 10 |
| ZnO | 5.0 | 5.0 | 5.0 | 5.0 | 5.0 | 5.0 |
| Agerite | 0.5 | 0.5 | 0.5 | 0.5 | 0 5 | 0.5 |
| Luperco 500-40KE | 6.0 | 6.0 | 6.0 | 6.0 | 6.0 | 6.0 |
| Zinc dimethyldi-thiocarbamate | — | 0.01 | 0.06 | 0.03 | 0.056 | 0.062 |
| Copper dimethyldithio-carbamate | — | 0.01 | 0.004 | 0.002 | 0.008 | 0.002 |
| $M_H$ (in-lbs) | 66 | 67 | 67 | 66 | 66 | 66 |
| $M_H$-$M_L$ (in-lbs) | 57 | 57 | 58 | 57 | 57 | 57 |
| $T_{C90}$ (mins) | 11.2 | 10.4 | 10.8 | 10.5 | 11.0 | 10.7 |
| $T_{S2}$ (mins) | 1.3 | 1.5 | 1.5 | 1.5 | 1.4 | 1.5 |
| $T_{S2}$* (mins) | 10.0 | 11.6 | 16.7 | 12.1 | 14.6 | 15.1 |

*Values obtained were under rheometer conditions of 135° C., ±3° arc.

This example indicates that the $T_{S2}$* (135° C.) value can be varied considerably by adjusting the levels of zinc dimethyldithiocarbamate and copper dimethyldithiocarbamate. The results show a minimal effect by the inhibitor mixture on the rheometer cure properties at 171° C., ±3° arc.

EXAMPLE 16

This example illustrates the effect of a mixture of bismuth dimethyldithiocarbamate and copper dimethyldithiocarbamate in an EPDM based composition. The rheometer test conditions were 171° C., ±3° arc.

TABLE 16

| Composition | Parts by Weight | | | |
|---|---|---|---|---|
| | A | B | C | D |
| Royalene ® 521 | 100 | 100 | 100 | 100 |
| N-990 | 40 | 40 | 40 | 40 |
| N-550 | 25 | 25 | 25 | 25 |
| Sunpar ® 2280 | 10 | 10 | 10 | 10 |
| ZnO | 5 | 5 | 5 | 5 |
| Agerite MA | 0.5 | 0.5 | 0.5 | 0.5 |
| Luperco 500-40KE | 6.0 | 6.0 | 6.0 | 6.0 |
| Bismuth dimethyldithio-carbamate | — | 0.06 | — | 0.06 |
| Copper dimethyldithio-carbamate | — | — | 0.006 | 0.006 |
| $M_H$ (in-lbs) | 65 | 65 | 55 | 65 |
| $M_H$-$M_L$ (in-lbs) | 55 | 55 | 46 | 55 |
| $T_{C90}$ (mins) | 11.2 | 10.8 | 11.0 | 11.2 |
| $T_{S2}$ (mins) | 1.3 | 1.5 | 1.5 | 1.3 |
| $T_{S2}$* (mins) | 10.0 | 13.6 | 10.2 | 14.8 |

*Values obtained were under rheometer conditions of 135° C., ±3° arc.

A synergistic effect in scorch time, as previously described, was obtained with the mixture, Column D, when the $T_{S2}$* values at 135° C., ±3° arc were compared. Minimal effect on rheometer cure properties was observed by the use of the inhibitor mixture.

EXAMPLE 17

This example illustrates the synergistic effect of the mixture of zinc dimethyldithiocarbamate and copper dimethyldithiocarbamate in an ethylene-propylene co-polymer based composition. Trimethylolpropane trimethacrylate was used as the co-agent. The rheometer test conditions were 171° C., ±3° arc.

TABLE 17

| Composition | Parts by Weight | | | |
|---|---|---|---|---|
| | A | B | C | D |
| Polysar ® 306 EPM** | 100 | 100 | 100 | 100 |
| N-539 | 60 | 60 | 60 | 60 |
| Agerite MA | 0.5 | 0.5 | 0.5 | 0.5 |
| Trimethylolpropane trimethacrylate | 3.0 | 3.0 | 3.0 | 3.0 |
| Luperco 500-40KE | 5.0 | 5.0 | 5.0 | 5.0 |
| Zinc dimethyldithio-carbamate | — | 0.10 | — | 0.10 |
| Copper dimethyldi-thiocarbamate | — | — | 0.006 | 0.006 |
| $T_{S2}$* (mins) | 4.4 | 5.9 | 4.7 | 7.6 |
| 100% Modulus (psi) | 830 | 810 | 760 | 820 |
| Ultimate tensile (psi) | 2690 | 2590 | 2620 | 2580 |
| Elongation (%) | 240 | 270 | 250 | 280 |
| Shore A Hardness | 82 | 82 | 82 | 82 |

*Value obtained under rheometer conditions of 135° C., ±3° arc.
**ethylene-propylene copolymer with a specific gravity of 0.86 and a Mooney Viscosity (ML1 + 4 (100° C.)) of 30–40 from Polysar Inc.

A synergistic effect on scorch resistance was observed in an ethylene-propylene copolymer based composition, with trimethylolpropane trimethacrylate as the co-agent; this illustrated by comparing the $T_{S2}$* values at 135° C., ±3° arc. Marginal effect on cure properties by the mixture was observed when Columns D and A are compared.

EXAMPLE 18

This example illustrates the synergistic effect of the mixture of zinc dimethyldithiocarbamate and copper dimethyldithiocarbamate on scorch resistance in an ethylene-propylene co-polymer based composition. Triallylisocyanurate was used as the co-agent. The rheometer test conditions were 171° C., ±3° arc.

TABLE 18

| Composition | Parts by Weight | | | |
|---|---|---|---|---|
| | A | B | C | D |
| Polysar ® 306 EPM | 100 | 100 | 100 | 100 |
| N-539 | 60 | 60 | 60 | 60 |
| Agerite MA | 0.5 | 0.5 | 0.5 | 0.5 |
| Triallyl isocyanurate | 3.0 | 3.0 | 3.0 | 3.0 |
| Luperco 500-40KE | 5.0 | 5.0 | 5.0 | 5.0 |
| Zinc dimethyldithio-carbamate | — | 0.10 | — | 0.10 |
| Copper dimethyldi-thiocarbamate | — | — | 0.006 | 0.006 |
| $M_H$ (in-lbs) | 132 | 122 | 129 | 124 |
| $M_H$-$M_L$ (in-lbs) | 119 | 109 | 115 | 111 |
| $T_{C90}$ (mins) | 6.5 | 6.3 | 6.3 | 6.6 |
| $T_{S2}$ (mins) | 1.0 | 1.3 | 1.0 | 1.4 |
| $T_{S2}$* (mins) | 6.5 | 9.9 | 6.8 | 12.0 |
| 100% Modulus (psi) | 1250 | 1170 | 1200 | 1120 |
| Ultimate tensile (psi) | 2450 | 2630 | 2550 | 2740 |
| Elongation (%) | 160 | 170 | 160 | 180 |
| Shore A Hardness | 85 | 85 | 85 | 85 |

*Value obtained under rheometer conditions of 135° C., ±3° arc.

A synergistic effect on scorch resistance was obtained in an ethylene-propylene based composition, with triallyl isocyanurate as the co-agent, as is illustrated by comparing the $T_{S2}$* values at 135° C., ±3° arc. Minimal effect by the inhibitor mixture (Column D) on the rheometer cure properties at 171° C., ±3° arc and on the physical properties of the cured compositions was observed when compared to Column A.

EXAMPLE 19

This example illustrates the synergistic effect of the mixture of zinc dimethyldithiocarbamate and copper dimethyldithiocarbamate in a low density polyethylene based composition. The preparation and crosslinking determination test followed were the same as in the standard experimental procedure. Mixing temperature was 120° C. The rheometer test conditions were 177° C., ±3° arc.

TABLE 19

| Composition | Parts by Weight | | | |
|---|---|---|---|---|
| | A | B | C | D |
| PE-102$^a$ | 100 | 100 | 100 | 100 |
| Luperox ® 500R$^b$ | 2.0 | 2.0 | 2.0 | 2.0 |
| Zinc dimethyldithio-carbamate | — | 0.06 | — | 0.06 |
| Copper dimethyldi-thiocarbamate | — | — | 0.006 | 0.006 |
| $M_H$ (in-lbs) | 26 | 25 | 27 | 23 |
| $M_H$-$M_L$ (in-lbs) | 23 | 22 | 23 | 20 |
| $T_{C90}$ (mins) | 8.4 | 8.4 | 8.5 | 8.6 |
| $T_{S2}$ (mins) | 2.0 | 2.0 | 2.0 | 2.1 |
| $T_{S2}$* (mins) | 6.8 | 7.7 | 7.0 | 8.6 |

*Values obtained were under rheometer conditions of 149° C., ±3° arc.
$^a$Low density polyethylene with a MFI of 10 g/10 min and a density of 0.921 g/cc, from El Paso Products.
$^b$Dicumyl peroxide, from Pennwalt Corp.

A synergistic effect on scorch resistance, as previously described, was obtained with the inhibitor mixture as is illustrated by comparing $T_{S2}$* values at 149° C., ±3± arc. Minimum effect by the inhibitor mixture on rheometer cure properties at 177° C., ±3° arc was observed.

EXAMPLE 20

This example illustrates that slight improvements in scorch resistance were obtained in a chlorinated polyethylene based composition with a mixture of zinc dimethyldithiocarbamate and copper dimethyldithiocarbamate.

The preparation and crosslinking determination test followed were the same as in the standard experimental procedure, with the exception that an extended Luperco 231-XL sample was prepared, containing 1.5 percent by weight of a 10 to 1 ratio of zinc dimethyldithiocarbamate to copper dimethyldithiocarbamate, hereby known as Mixture P. Mixture P was compared to the control on an equal active peroxide basis. Mixing temperature was 60° C. The rheometer test conditions were 143° C., ±3° arc for Columns A and B, and 160° C., ±3° arc for Columns C and D.

Comparing the $T_{S2}$* (121° C.) values of A and B and C and D in the following Table 22 show a marginal improvement in scorch resistance.

TABLE 20

| Composition | Parts by Weight | | | |
|---|---|---|---|---|
| | A | B | C | D |
| CM-0136$^a$ | 100 | 100 | 100 | 100 |
| N-550 | 40 | 40 | 40 | 40 |
| MgO | 10 | 10 | 10 | 10 |
| Santicizer ® 711$^b$ | 25 | 25 | 20 | 20 |
| Triallyl isocyanurate | 2.0 | 2.0 | 2.0 | 2.0 |
| Luperco ® 231-XL | 4.94 | — | — | — |
| Mixture P | — | 5.04 | — | — |
| Luperco ® 230-XL$^c$ | — | — | 5.0 | 5.0 |
| Zinc dimethyldithio-carbamate | — | — | — | 0.06 |
| Copper dimethyldi-thiocarbamate | — | — | — | 0.006 |

TABLE 20-continued

| Composition | Parts by Weight | | | |
|---|---|---|---|---|
| | A | B | C | D |
| $M_H$ (in-lbs) | 62 | 56 | 65 | 59 |
| $M_H$-$M_L$ (in-lbs) | 40 | 36 | 43 | 37 |
| $T_{C90}$ (mins) | 11.0 | 11.2 | 8.9 | 9.1 |
| $T_{S2}$ (mins) | 1.8 | 1.9 | 1.7 | 1.7 |
| $T_{S2}$* (mins) | 6.0 | 6.9 | 15.5 | 17.5 |
| 200% Modulus (psi) | 1000 | 800 | 1130 | 950 |
| Ultimate tensile (psi) | 2240 | 2220 | 2160 | 2050 |
| Elongation (%) | 450 | 530 | 400 | 470 |
| Shore A Hardness | 75 | 74 | 75 | 74 |

*Values obtained were under rheometer conditions of 121° C., ±3° arc.
<sup>a</sup>Chlorinated polyethylene elastomer with a specific gravity of 1.16, a chlorine content of 36%, and a Mooney Viscosity (ML1 + 4 (250° F.)) of 38, from Dow Chemical Co.
<sup>b</sup>Linear phthalate ester plasticizer, from Monsanto Industrial Chemical Co.
<sup>c</sup>40% n-butyl 4,4-di(t-butylperoxy)valerate on inert filler, from Pennwalt Corp.

What is claimed:

1. A scorch resistant, crosslinkable composition comprising 100 parts by weight of a polymeric thermoplastic and/or elastomeric material selected from the group of ethylene-propylene terpolymers, ethylene-propylene co-polymers, 1,4-polybutadiene, chlorinated polyethylene, and polyethylene, about 0.1 to about 10 parts by weight of an organic peroxide free radical initiator selected from dialkyl peroxides or diperoxyketals, and from about 0.001 to about 2.0 parts by weight of a mixture of at least two salts of disubstituted dithiocarbamic acid, wherein one salt is based on copper and the other salts have the structure

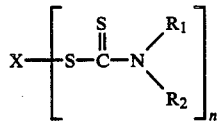

wherein X is selected from zinc, lead, nickel, bismuth, cadmium, selenium, and tellurium, n is an integer of 2 to 4, and $R_1$ and $R_2$ are independently selected from alkyl of 1 to 7 carbons, the weight ratio of non-copper salt(s) to copper based salt is 1:1 to 20:1, and the weight ratio of organic peroxide to the salts is 100:1 to 5:1.

2. The composition of claim 1 wherein the copper based metal salt is copper dimethyldithiocarbamate.

3. The composition of claim 2 wherein the organic peroxide free radical initiator is selected from dicumyl peroxide, di-t-butyl peroxide, t-butyl cumyl peroxide, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexyne-3, di(2-(t-butylperoxy)isopropyl)benzene, 1,1-di(t-butylperoxy)cyclohexane, n-butyl 4,4-di(t-butylperoxy)valerate, and ethyl 3,3-di(t-butylperoxy)butyrate.

4. The composition of claim 3 wherein at least one filler is present.

5. A process for preventing the scorching of a crosslinkable composition which is susceptible to scorching during the processing and prior to the intended crosslinking thereof, said composition comprising, in weight ratio, 100 parts by weight of a polymeric thermoplastic and/or elastomeric material selected from the group of ethylene-propylene terpolymers, ethylene-propylene co-polymers, 1,4-polybutadiene, chlorinated polyethylene, and polyethylene, and about 0.1 to about 10 parts by weight of at least one organic peroxide free radical initiator selected from dialkyl peroxides and diperoxyketals which comprises admixing into said composition prior to said processing from about 0.001 to about 2.0 parts by weight of a mixture of copper dimethyldithiocarbamate and at least one other salt of disubsituted dithiocarbamic acid having the structure

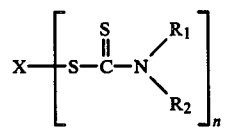

wherein X is selected from zinc, lead, nickel, bismuth, cadmium, selenium, and tellurium, n is an integer of 2 to 4, and $R_1$ and $R_2$ are independently selected from alkyl of 1 to 7 carbons wherein the weight ratio of non-copper salt(s) to copper based salt is 1:1 to 20:1, and the weight ratio of organic peroxide to the salts is 100:1 to 5:1.

6. A peroxide composition comprising an organic peroxide free radical initiator selected from dialkyl peroxides or diperoxyketals and a mixture of at least two salts of disubstitued dithiocarbamic acid, wherein one salt is based on copper and the other salts have the structure

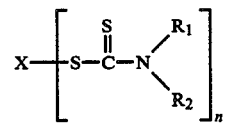

wherein X is selected from zinc, lead, nickel, bismuth, cadmium, selenium, and tellurium, n is an integer of 2 to 4, and $R_1$ and $R_2$ are independently selected from alkyl of 1 to 7 carbons and the weight ratio of non-copper salt(s) to copper based salt is 1:1 to 20:1 and the weight ratio of organic peroxide to the salts is 100:1 to 5:1.

7. The peroxide composition of claim 6 wherein at least one filler is present selected from calcium silicate, silica, alkaline earth metal carbonates, and clays.

8. The peroxide composition of claim 7 wherein the organic peroxide free radical initiator is selected from 1,1-bis(t-butylperoxy)-3,3,5-trimethylcyclohexane, dicumyl peroxide, di-t-butyl peroxide, t-butyl cumyl peroxide, 2,5-dimethyl-2,5-di(t-butylperoxy)hexane, 2,5-dimethyl-2,5-di(t-butylperoxy)hexyne-3, di(2-(t-butylperoxy)isopropyl)benzene, 1,1-di(t-butylperoxy)cyclohexane, n-butyl 4,4-di(t-butylperoxy)valerate, and ethyl 3,3-di(t-butylperoxy)butyrate.

* * * * *